(12) United States Patent
Chen

(10) Patent No.: US 9,363,523 B2
(45) Date of Patent: Jun. 7, 2016

(54) METHOD AND APPARATUS FOR MULTI-CORE VIDEO DECODER

(71) Applicant: Amlogic Co., Ltd., Santa Clara, CA (US)

(72) Inventor: Shi Chen, Cupertino, CA (US)

(73) Assignee: Amlogic Co., Limited, Hong Kong (HK)

( * ) Notice: Subject to any disclaimer, the term of this patent is extended or adjusted under 35 U.S.C. 154(b) by 393 days.

(21) Appl. No.: 14/044,686

(22) Filed: Oct. 2, 2013

(65) Prior Publication Data

US 2015/0092841 A1    Apr. 2, 2015

(51) Int. Cl.

| | |
|---|---|
| *H04N 7/12* | (2006.01) |
| *H04N 11/02* | (2006.01) |
| *H04N 11/04* | (2006.01) |
| *H04N 19/43* | (2014.01) |
| *H04N 19/44* | (2014.01) |

(52) U.S. Cl.
CPC ............... *H04N 19/43* (2014.11); *H04N 19/44* (2014.11)

(58) Field of Classification Search
CPC ...... H04N 19/43; H04N 19/44; H04N 19/436; H04N 19/439; H04N 19/50; H04N 19/51; H04N 19/423; H04N 19/42
USPC .................. 375/240.08, 240.25; 348/716–718
See application file for complete search history.

(56) References Cited

U.S. PATENT DOCUMENTS

| | | | | |
|---|---|---|---|---|
| 5,623,311 A | * | 4/1997 | Phillips | H04N 7/015 348/715 |
| 2008/0148022 A1 | * | 6/2008 | Piry | G06F 9/384 712/217 |
| 2008/0310555 A1 | * | 12/2008 | Kee | G06F 9/5077 375/340 |
| 2010/0080303 A1 | * | 4/2010 | Suzuki | H04N 19/42 375/240.25 |

* cited by examiner

*Primary Examiner* — Andy Rao
*Assistant Examiner* — Jared Walker
(74) *Attorney, Agent, or Firm* — Venture Pacific Law, PC

(57) ABSTRACT

A method and apparatus for a multi-core video decoder for decoding a single bitstream are disclosed. The multi-core video decoder comprises a first video decoder configured to receive the bitstream, parse header information to determine buffer management for a plurality decoding jobs based on the header information, and assign decoding jobs based upon the buffer management. A second video decoder configured to receive the bitstream and decode the bitstream based on an assigned decoding job from the first video decoder.

20 Claims, 5 Drawing Sheets

METHOD AND APPARATUS FOR MULTI-CORE VIDEO DECODER

BACKGROUND

1. Technical Field

This disclosure generally relates to video decoding, and more particularly to video decoding using multiple video decoding cores.

2. Related Art

Compression and encoding technologies are widely used in order to transmit and store still image data and moving image data with good efficiency. In the case of moving images, there are many known types of video compression, including those associated with the Motion Pictures Expert Group ("MPEG") among others. However, for purposes of clarity by way of example and not limitation, MPEG terminology is used. The methods MPEG-1 to 4 or ITU (International Telecommunication Union) H.261 to H.264 are widely used for video compression.

In video compression, motion compensation may be used. Generally, a video sequence includes a number of pictures or frames. Frames in a sequence are often substantially similar, and thus contain a significant amount of redundant information. In order to reduce the amount of data needed to represent the video, redundant information may effectively be removed by using a reference frame and a number of residual frames. As residual frames are indexed to a reference frame, the residual frames may contain less information than the reference frame. Accordingly, the residual frames may be encoded at a lower bit rate with the same quality as associated original frames from which the residual frame were derived.

Although there are other approaches to approximate motion of an entire scene and objects in a video sequence which may produce higher quality residual frames than the motion compensation approach of subtracting differences between frames, the effective bit rate of higher quality video compression is significantly much larger.

Using the generalized MPEG approach, frames are processed in groups. One frame, often the first frame of a group of frames, is encoded without motion compensation as a reference frame. The reference frame, which is an intracoded frame ("I-frame" or "I-picture") is combined with predicted frames ("P-frames or P-pictures"). One or more P-frames may be predicted from a preceding I-frame or P-frame.

Moreover, frames may be predicted from future frames. Predicted frames from future frames may be predicted from two directions, such as for example from an I-frame and a P-frame that respectively immediately precede and follow the bidirectionally predicted frame. Conventionally, bidirectionally predicted frames are called "B-frames" or "B-pictures". Since MPEG video encoding is well known, further details regarding specifics of MPEG video encoding are not described.

One main goal in video compression is to reduce the effective bit rate of the encoded video stream. During playback, video decoding relies on similar scenes from previous and/or adjacent frames that have been encoded to produce a current frame. As such, decoding can rely heavily on previously accessed data. Intense data access can be directly associated with more power consumption, particularly in portable hand held device like smarts phones, phablets, tablets, laptops, etc. when their battery power is limited. Even with consumer appliances, desktop devices, TVs, video player, etc., reducing heavy data access is important not only from a power consumption standpoint, but from a performance standpoint. If a device can be operated at a lower frequency to accommodate more efficient data access, the entire system for the device can operate at the lower frequency. As more performance demand is required, there is built-in margin within the system than can afford the system to operate at an increased frequency for increased performance. The built-in margins also afford system designs that can have a longer product life cycle without the need to upgrade.

FIG. 1 illustrates a generalized prior art motion compensation apparatus or video coding using the H.264 video encoding standard that estimates a motion vector between pictures on a block-by-block basis. The motion compensation apparatus includes a command queue 2, motion compensation block 3, DRAM controller 4, and picture reconstruction block 5. The motion compensation apparatus receives a current picture to be decoded including a current block to be decoded, as well as a reference picture which is referred to for decoded motion vectors. Command queue 2 provides a series of commands to the motion compensation block 3, and based on the commands, the motion compensator block 3 sends requests to the DRAM controller to retrieve reference blocks from memory to interpolate the reference block based on the motion vectors of the current block. The interpolated data is sent to the picture reconstruction block 5 to reconstruct the picture based on the motion vector data.

The American Advanced Television Systems Committee (ATSC) HDTV system began broadcasting over air (OTA) signal in late 1998. Now, high definition television (HDTV) is almost ubiquitous in a majority of households. The HDTV standard can be based on 1080 P (progressive) at 60 fps with 1920×1080 p pixels. The total number of pixels per frame is approximately 2.1 Mega pixels. Although there are other formats that may be used such as 1080i (interlaced) with 1920×1080i pixels, or even 720P with 1280×720p, the 1080P format can be considered as providing the best viewing picture with the most pixel transmission rate of approximately 2.1 Mega pixels/frame. Decades later, a new ultra high definition TV (UHDTV), Ultra HD, or UHD standard is beginning to become available for consumers. As an example of the UHDTV standard, the total pixel count can be in the neighborhood of 4K×2 k (4096 pixels×2048 pixels) with a frame of 30 frames per second. The effective bitrate of the UHDTV standard is approximately four times the number of pixels of HDTV. Designers of new systems capable of decoding UHDTV want to adapt to the new UHDTV standard quickly and with minimal impact to existing designs. Stated differently, designers are finding ways to leverage existing working designs and existing silicon chips rather than forced to design new chips and circuitry to decode the new UHDTV standard.

In efforts to adopt to the newer higher pixel bitrate requirements, designing new video decoding systems to decode UHDTV transmissions will be costly and time consuming. A key to market success is to provide UHDTV decoding capability timely and quickly to market. What is needed is a video decoding apparatus that can effectively decode an UHDTV video stream using motion vectors which leverages existing designs used for decoding HDTV video streams.

SUMMARY OF INVENTION

The present invention provides a multi-core video decoder for decoding a single bit stream. A plurality of single core video decoder can be coupled together to provide decoding capable of higher bitrates to meet the demand of UHDTV. Accordingly, a method and apparatus for a multi-core video decoder is disclosed. The multi-core video decoder for decoding a single bitstream comprises a first video decoder configured to receive the bitstream, parse header information to determine buffer management for a plurality decoding jobs based on the header information, and assign decoding jobs based upon the buffer management. A second video decoder is configured to receive the bitstream and decode the bitstream based on an assigned decoding job.

In accordance to another embodiment of the present invention, the first video decoder allocates a plurality of buffers based on the header information for the plurality of decoding jobs.

In accordance to another embodiment of the present invention, the plurality of buffers each store decoding data for a particular decoding job.

DETAILED DESCRIPTION

Figure 1:
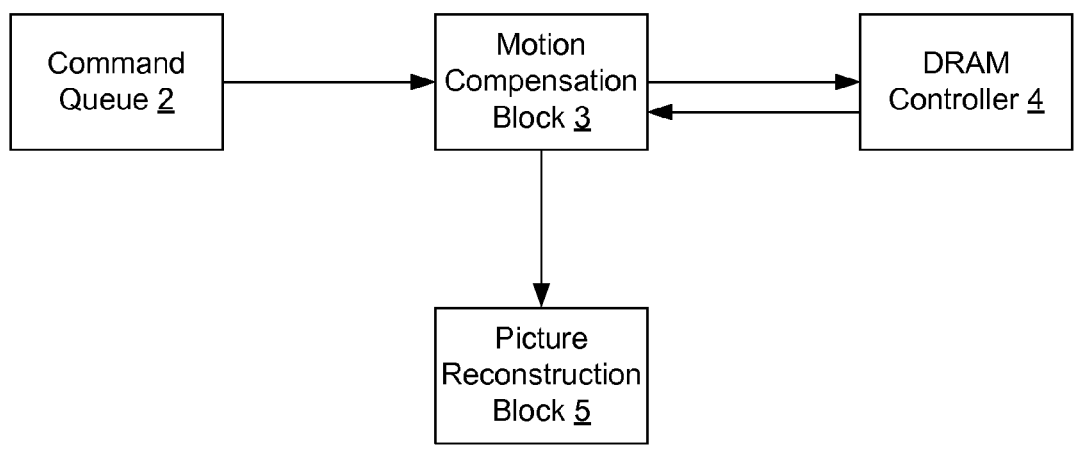
FIG. 1 illustrates a generalized prior art motion compensation apparatus for a H264 decoder.
Figure 2:
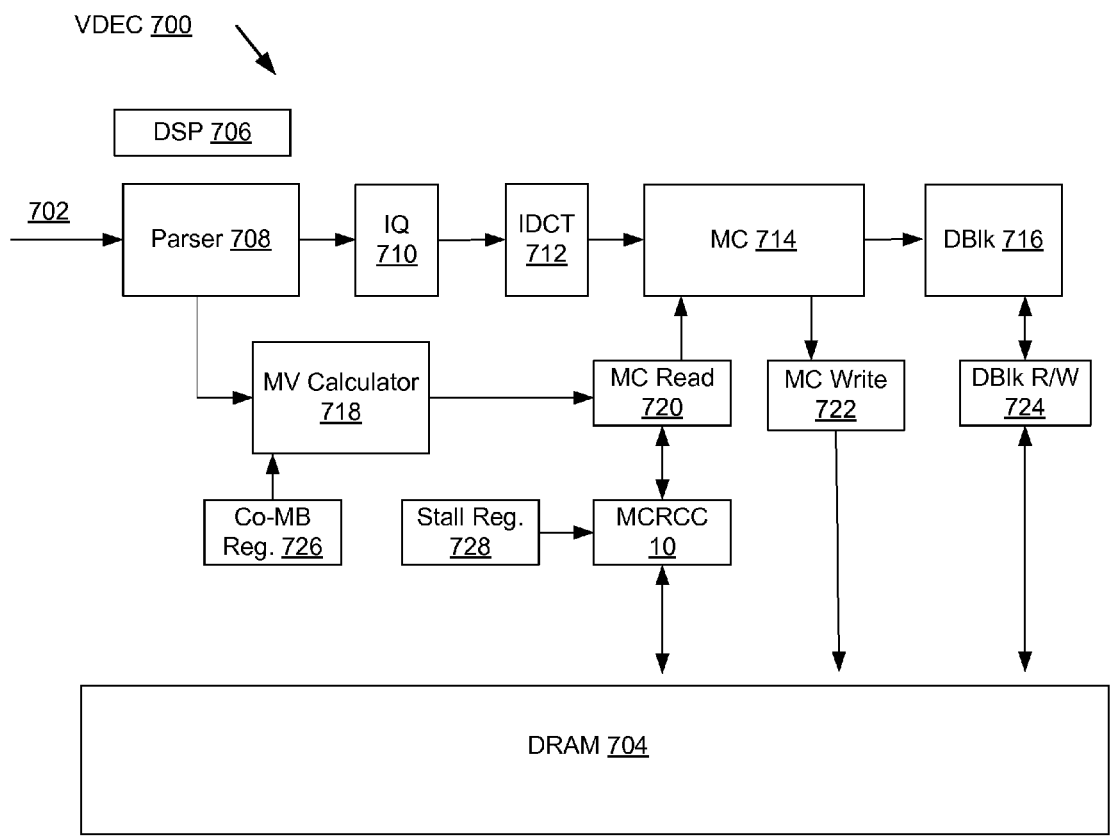
FIG. 2 illustrates a generalized video decoder in accordance to an embodiment of the present invention accordance with an embodiment of the present invention.

FIG. 2 illustrates a generalized video decoder (VDEC) 700 in accordance to an embodiment of the present invention. The video decoder 700 is an example of a single core video decoder that includes the MCRCC 10 to increase decoder performance as discussed above. In general, the video decoder 700 receives a bitstream 702 at the Parser 708 that parses headers embedded in the bitstream 702. The headers of the bitstream 702 may include sequence header information such as picture size, type information and picture header information that may include I-frame, P-frame, B-frame, reference information. Inverse quantizer 710 performs inverse quantization, and inverse discrete cosine transform (DCT) 712 performs inverse DCT. Generally, the motion vector (MV) calculator 718 receives motion vector data from the parser 708. The motion vector data from the MV calculator is forwarded to motion compensation (MC) read register 720. In accordance to an embodiment of the present invention, the MC read register 720 is coupled to a motion compensation reference cache controller (MCRCC) 10 to retrieve reference information from the MCRCC 10 if the reference information is cached or alternatively from the dynamic ram (DRAM) 704. Details of the MCRCC is described in pending U.S. patent application entitled "Method and Apparatus for Motion Compensation Reference Data Caching" having US publication number US2015/0055707A1; the application is herein incorporated by reference. Motion compensation 714 reads the reference data based on the motion vector. The motion compensation data based on the motion vector is written to motion compensation (MC) write register 722 and to DBlk 716. DBlk 716 smooths edges between blocks for a more even picture. The Dblk 716 is coupled to Dblk read and write register 724 for reading and writing data to the DRAM 704.

In accordance to an embodiment of the present invention, the VDEC 700 operates in a multi-core mode in which multiple VDECs 700 are configured to decode the single bitstream to increase decoding speed. Multiple VDECs 700 can be scaled for higher resolution and greater bitrate decoding. Since multiple cores are decoding a single bitstream, there are instances when one core may be decoding data that is dependent on data from another core that may not yet be available since the another core has not decoded data. Accordingly, the VDEC 700 includes a stall register 728 that provides x,y position information for coordinating multi-core processing. Similarly, the MV calculator 718 includes a Co-MB register 726 to handle multi-core decoding of a B-frame. In such instance, a B-frame does not include motion vector information. Rather, the motion vector information is based on a previous P-frame. Accordingly, in accordance to an embodiment of the present invention, the motion vector from the previous P-frame is stored in the Co-MB register 726 for use during decoding of the B-frame. The motion vector for the B-frame is based on the motion vector of the P-frame and the reference data for the B-frame. Without the Co-MB register 726, the motion vector for the B-frame will be calculated by accessing DRAM 704. Performance gain is achieved by storing the motion vector of the P-frame in the Co-MB register 726 and simply retrieving the motion vector to decode the B-frame rather than accessing DRAM 704 and performing the calculation to derive the motion vector.

Figure 3:
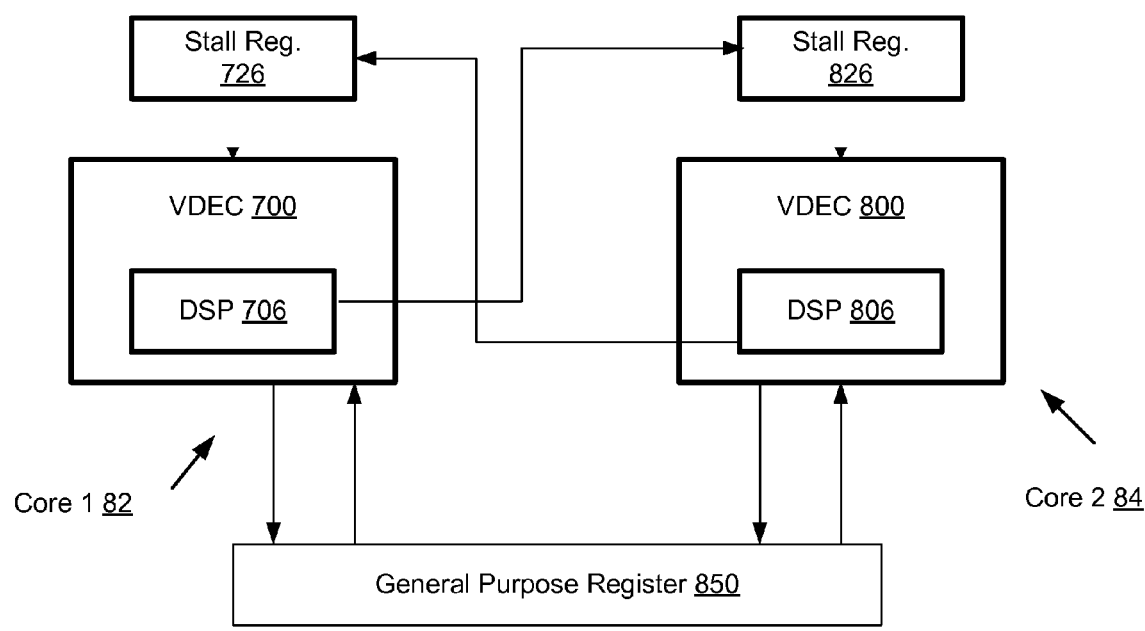
FIG. 3 illustrates a multi-core video decoder in accordance to an embodiment of the present invention.

FIG. 3 illustrates a multi-core video decoder in accordance to an embodiment of the present invention. The multi-core video decoder includes a Core 1 82 and a Core 2 84. Although more cores may be joined, two cores are shown. The Core 1 82 includes a video decoder (VDEC) 700 and a DSP 706. A stall register 726 is coupled to the VDEC 700. The Core 2 84 includes video decoder (VDEC) 800 and DSP 806. A stall register 826 is coupled to VDEC 800. DSP 706 is coupled to stall register 826 of core 2 84. DSP 806 is coupled to stall register 726 of core 1 82. Each VDEC 700 and VDEC 800 is coupled to general purpose register 850 in which programming instructions and data are transferred to and from a host system. Accordingly, the general purpose register 850 provides programming information to coordinate the decoding by core 1 82 and core 2 84. In accordance to an embodiment of the present invention, after each macro-block is decoded, x,y position information from the decoding video decoder is forwarded to another video decoder using the stall register. For example, once core 1 82 completes its decoding of a current macro-block, the x,y decoding position information for the current macro-block is forwarded to the stall register 826 of the core 2 84 video decoder. By forwarding the x,y position information to the other video decoder, the other video decoder can begin decoding where the previous video decoder completed which saves time and additional processing by not having to calculate the x,y position information using motion vector information that is retrieved from memory. Depending on programmed instructions and scene, the DSP may update the stall register after decoding a single macro-block, several macro-blocks, a full row of macro-blocks or combinations, etc. Accordingly, in order to calculate the x,y decoding position, additional memory access and processing are needed to generate the x,y decoding position that is based on motion vector information. In accordance to an embodiment of the present invention, the stall register is directly coupled to the video decoder and provides x,y position information directly to the video decoder.

Figure 4:
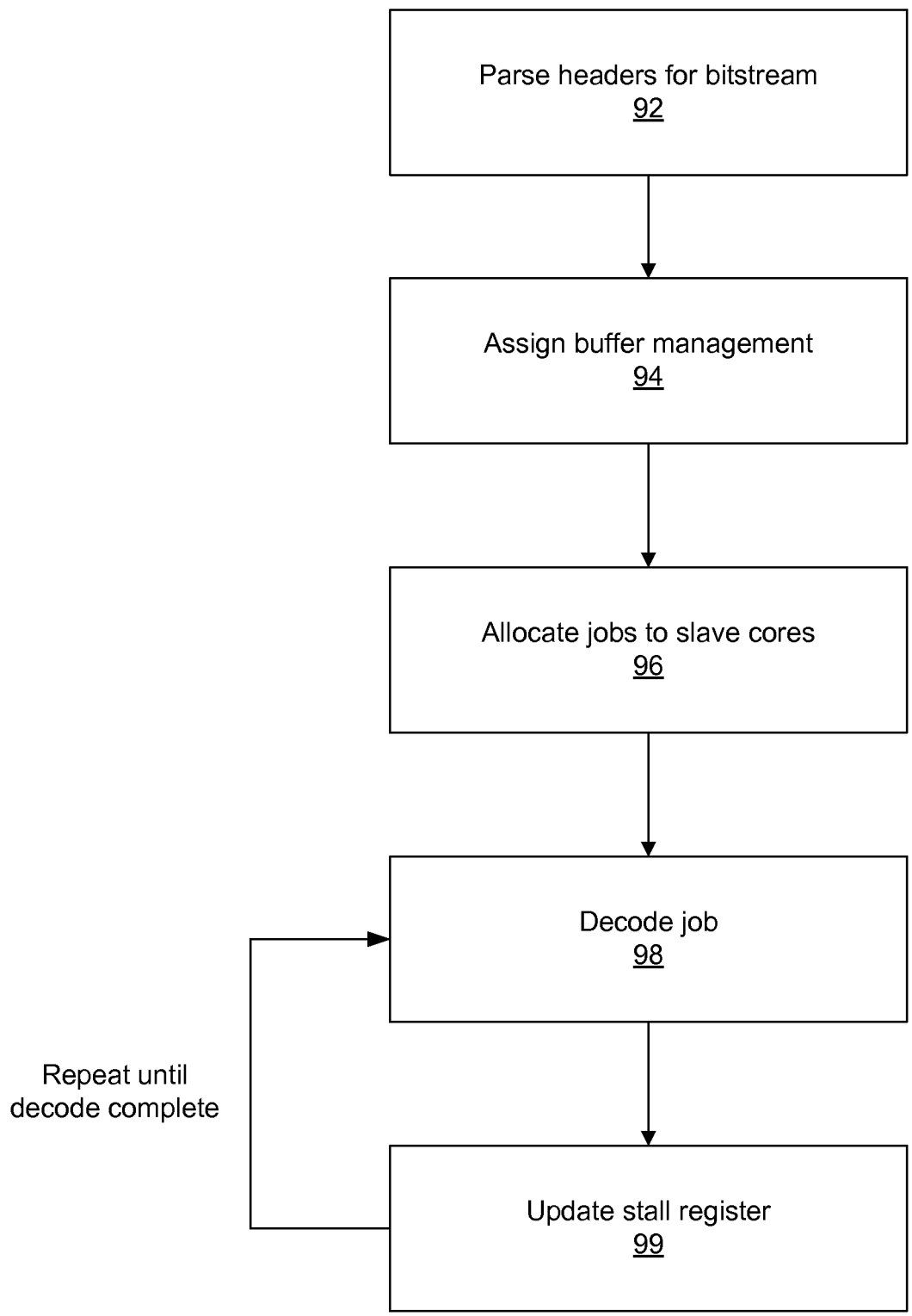
FIG. 4 illustrates a flow diagram of the multi-core video decoder in accordance to a master-slave embodiment of the present invention.

FIG. 4 illustrates a flow diagram of the multi-core video decoder in accordance to a master-slave embodiment of the present invention. The flow diagram begins with step 92 in which core 1 82 receives a video bitstream and parses the headers in the bitstream to determine sequence information, picture information, and other header information. Core 1 82 in accordance to an embodiment of the present invention is assigned as a master core while core 2 84 and other VDEC cores are assigned as slave cores. Next, in step 94, as the master, core 1 82 assigns buffer management and determines where within memory read and write buffers will reside during decoding. In other words, if the bitstream includes a plurality of I-frame, P-frame and B-frame, core 1 82 assigns buffer locations in memory that will be used to decode the I-frame, P-frame, and B-frame. In step 96, core 1 72 allocates decoding jobs to slave cores. For examples, core 1 82 may be allocated the job of decoding the I-frame, and core 2 84 may be allocated the job of decoding the P-frame. Another slave core may be allocated the job of decoding the B-frame. In step 98, the multi-core video decoder decodes the jobs based upon the job allocation. In step 99, after the decode job step, update the stall register with x,y position information for the other video processor. The flow diagram returns to decode job step 98 until the decode jobs are complete. With respect to the master-slave embodiment of the multi-core video decoder, the master video decoder operates on a different set of instruction than its slave video decoder counter parts. As the master video decoder, programming instructions will be different from the other slave video decoders. In some cases, the master-slave arrangement for operating the multi-core video decoder can be more involved since additional programming instructions are used to coordinate the master video decoder.

Figure 5:
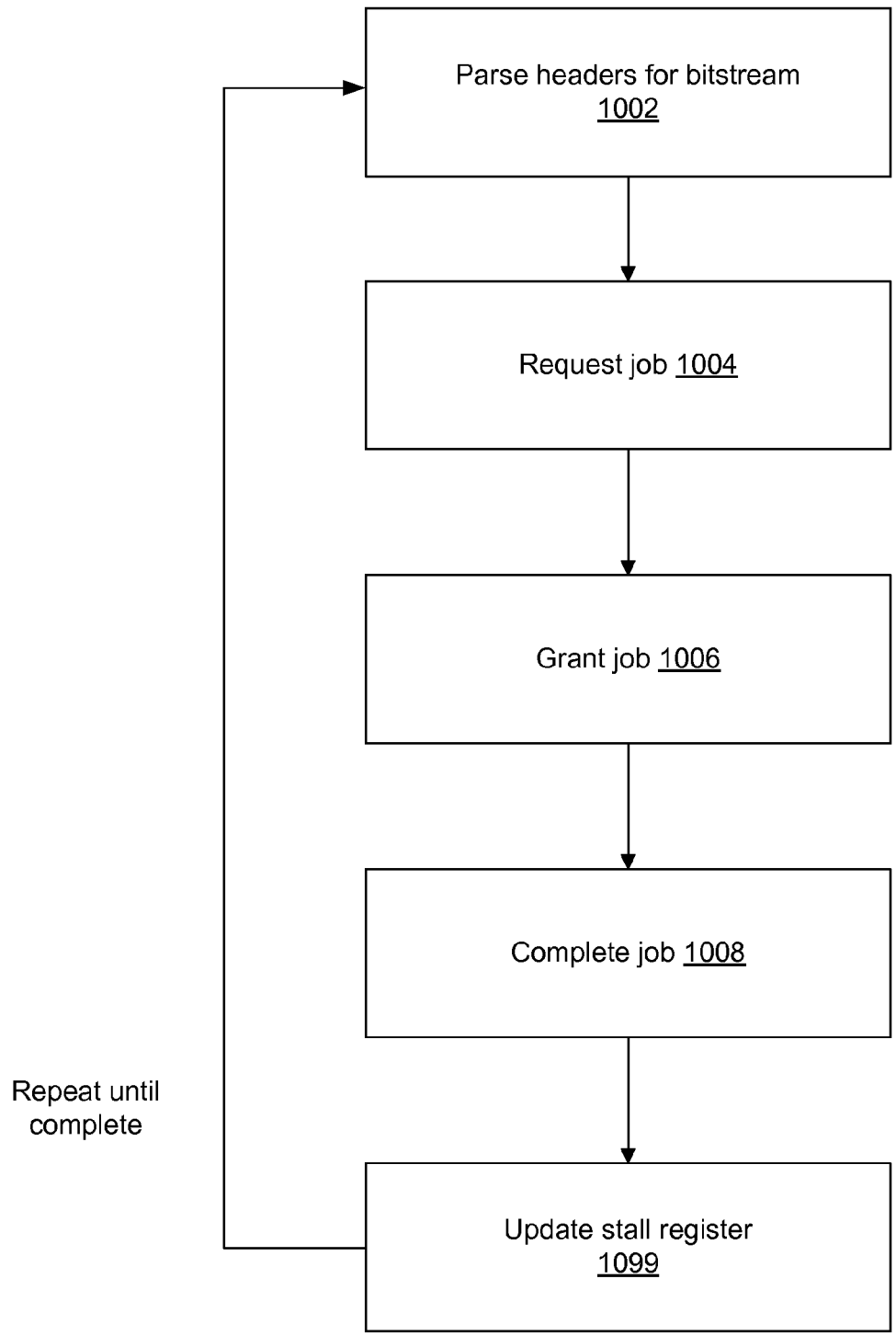
FIG. 5 illustrates a flow diagram of the multi-core video decoder in accordance to another embodiment of the present invention.

FIG. 5 illustrates a flow diagram of the multi-core video decoder in accordance to another embodiment of the present invention. In contrast with the master-slave arrangement of the multi-core video decoder, the programming instructions for the VDECs operate using a same set of instructions. The flow diagram begins with step 1002 in which the program instructions cause the VDECs to parses the headers for the received bitstream to determine header information such as sequence, picture header information and slice header and data information for the varies I-frames, P-frames and B-frames being decoded. In step 1004, based on the decoded bitstream information, each VDEC in the multi-core video decoder requests a particular decoding job. In step 1006, if another VDEC has not requested the same decoding job, the requesting VDEC is granted the decoding job. In an embodiment of the present invention, the jobs are granted on a first-come-first-serve basis. Next, the VDEC completes the decoding job in step 1008. After the decoding job is complete, the VDEC updates the stall register of another VDEC and returns to step 1002 and repeat the flow diagram until the bitstream is decoded. In the case where there are more VDECs, all the stall register are updated by the VDEC. Since the VDECs operate on a same set programming instructions, the size and complexity of the decoding system can be greatly reduced.

A multi-core VDEC is disclosed that can scale to decode greater bitrates and accommodate greater decoding demand. With an increase in demand for decoding bandwidth from the advent of new technologies and video standards, the multi-core VDEC scales to meet the increased decoding bandwidth. With the ability to scale, new costly silicon does not have to be immediately designed to meet the new standards in decoding demands.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Moreover, the above disclosure is not intended to limit the present invention. The scope of the present invention is defined by the claims.

I claim:

1. A multi-core video decoder for decoding a single bitstream having encoded video frames, comprising:
    a first video decoder configured to receive the bitstream, parse header information to determine buffer management for a plurality decoding jobs based on the header information, and assign decoding jobs based upon the buffer management; and
    a second video decoder configured to receive the bitstream and decode the bitstream based on an assigned decoding job from the first video decoder,
    wherein a first stall register and the first video decoder are coupled to each other,
    wherein a second stall register and the second video decoder are coupled to each other,
    wherein each of the encoded video frames has macroblocks with x,y positions,
    wherein the first video decoder decodes certain one or more macroblocks of the encoded video frames,
    wherein, once the certain one or more macroblocks are decoded, the x,y positions of the certain one or more macroblocks are inputted to the second stall register for use by the second video decoder,
    wherein the first video decoder and the second video decoder are coupled to a general purpose register, and
    wherein the general purpose register transfers programming instructions and data to and from a host system.

2. The multi-core video decoder of claim 1, wherein the first video decoder allocates a plurality of buffers based on the header information for the plurality of decoding jobs.

3. The multi-core video decoder of claim 2, wherein the plurality of buffers each store decoding data for a particular decoding job.

4. The multi-core video decoder of claim 3, wherein a particular decoding job includes decoding an I-frame, P-frame, or B-frame.

5. The multi-core video decoder of claim 1, wherein the first video decoder is configured to decode the bitstream based on another decoding job.

6. The multi-core video decoder of claim 5, wherein the another decoding job is a decoding job from the plurality of decoding jobs.

7. The multi-core video decoder of claim 6, wherein the first decoder updates the second stall register with decoding position information from the another decoding job.

8. The multi-core video decoder of claim 7, wherein the second video decoder decodes the assigned decoding job based on the decoding position information from the another de-coding job of the first video decoder.

9. The multi-core video decoder of claim 1, wherein the second decoder updates the first stall register with decoding position information from the assigned decoding job.

10. The multi-core video decoder of claim 9, wherein the first video decoder decodes the an-other decoding job based on the decoding position information from the assigned decod-ing job of the second video decoder.

11. The multi-core video decoder of claim 1, wherein the first video decoder is a master.

12. The multi-core video decoder of claim 1, wherein the second video decoder is a slave.

13. The multi-core video decoder of claim 1 wherein the second video decoder decodes one or more select macroblocks of the encoded video frames as a function of the x,y positions of the certain one or more macroblocks.

14. The multi-core video decoder of claim 1 wherein the second stall register stores the x,y positions of the certain one or more macroblocks.

15. The multi-core video decoder of claim 14 wherein the second video decoder begins decoding a next x,y position based on the stored x,y positions.

16. The multi-core video decoder of claim 14 wherein the second video decoder determines if any dependent data has been decoded by the first video decoder based on the x,y positions stored in the second stall register.

17. The multi-core video decoder of claim 1 wherein the second video decoder decodes select one or more macroblocks of the encoded video frames, and wherein, once the select one or more macroblocks are decoded, the x,y positions of the select one or more macroblocks are inputted to the first stall register for use by the first video decoder.

18. The multi-core video decoder of claim 17 wherein the first stall register stores the x,y positions of the select one or more macroblocks.

19. The multi-core video decoder of claim 18 wherein the first video decoder begins decoding a next x,y position based on the stored x,y positions.

20. The multi-core video decoder of claim 18 wherein the first video decoder determines if any dependent data has been decoded by the second video decoder based on the x,y positions stored in the first stall register.

\* \* \* \* \*